United States Patent [19]

Schultz

[11] 4,353,620
[45] Oct. 12, 1982

[54] OPTICAL FIBER CONNECTOR CONSTRUCTION

[75] Inventor: Ronald L. Schultz, Northfield, Ill.

[73] Assignee: TRW Inc., Elk Grove Village, Ill.

[21] Appl. No.: 149,889

[22] Filed: May 14, 1980

[51] Int. Cl.³ .............................................. G02B 7/26
[52] U.S. Cl. ................................................. 350/96.21
[58] Field of Search ............... 350/96.20, 96.21, 96.22, 350/320

[56] References Cited

U.S. PATENT DOCUMENTS

| | | | |
|---|---|---|---|
| 3,870,395 | 3/1975 | Schickentanz | 350/96.21 |
| 3,871,744 | 3/1975 | Bridger et al. | 350/96.21 |
| 3,885,859 | 5/1975 | Dalgleish et al. | 350/96.21 |
| 3,902,785 | 9/1975 | Matthews | 350/96.21 |
| 3,936,142 | 2/1976 | Kersten | 350/96.21 X |
| 3,936,143 | 2/1976 | Sato | 350/96.21 |
| 3,936,145 | 2/1976 | McCartney | 350/96.22 |
| 3,944,328 | 3/1976 | Kent et al. | 350/96.21 |
| 3,947,182 | 3/1976 | McCartney | 350/96.22 |
| 3,948,582 | 4/1976 | Martin | 350/96.21 |
| 3,950,075 | 4/1976 | Cook et al. | 350/96.22 |
| 3,989,567 | 11/1976 | Tardy | 350/96.20 X |
| 3,990,779 | 11/1976 | McCartney | 350/96.21 |
| 4,008,948 | 2/1977 | Dalgleish et al. | 350/96.21 |
| 4,047,796 | 9/1977 | Kao et al. | 350/96.20 |
| 4,047,797 | 9/1977 | Arnold et al. | 350/96.20 |
| 4,088,390 | 5/1978 | McCartney | 350/96.21 |
| 4,193,665 | 3/1980 | Arnold | 350/96.22 |

FOREIGN PATENT DOCUMENTS

| | | | |
|---|---|---|---|
| 26139 | 1/1981 | European Pat. Off. . | |
| 2291510 | 6/1976 | France | 350/96.21 |
| 2299655 | 8/1976 | France . | |
| 1556476 | 11/1979 | United Kingdom | 350/96.21 |

OTHER PUBLICATIONS

Article "Demountable Connectors for Optical Fiber Systems," Bedgood et al., *Electrical Communication*, vol. 52, No. 2, 1976.
Article "Preparation of Optical-Fiber Ends for Low-Loss Tape Splices," Chinnock et al., *The Bell System Technical Journal*, vol. 54, No. 3, Mar. 1975.
"Connecting the Thread of Light," by Fenton et al., *Ninth Annual Connector Symposium*, Oct. 1976.
Scanning the Field for Ideas, *Machine Design*, vol. 52, No. 1, Jan. 1980.
A Connector-Like Device for Joining Optical Fibers, Goldstein et al., Twelfth Annual Connector Symposium Proceedings, Cherry Hill, N.J., Oct. 1979, pp. 213-220.

*Primary Examiner*—John D. Lee
*Attorney, Agent, or Firm*—Neuman, Williams, Anderson & Olson

[57] ABSTRACT

A connector for use in effecting an optical signal transmissive connection between the ends of optical fibers is provided. The connector comprises a tricuspid fiber-receiving channel defined by three convex walls connected along three longitudinal edges. The three convex walls are sufficiently rigid and uniform so that upon application of forces at the edges and directed toward the center of the channel defined by the convex walls, each of the three convex walls inwardly flexes in a uniform manner. As a result, abutting ends of optical fibers disposed within the channel defined by such convex walls will be tangentially engaged by each of the walls and the fibers will be aligned along a common longitudinal axis.

25 Claims, 13 Drawing Figures

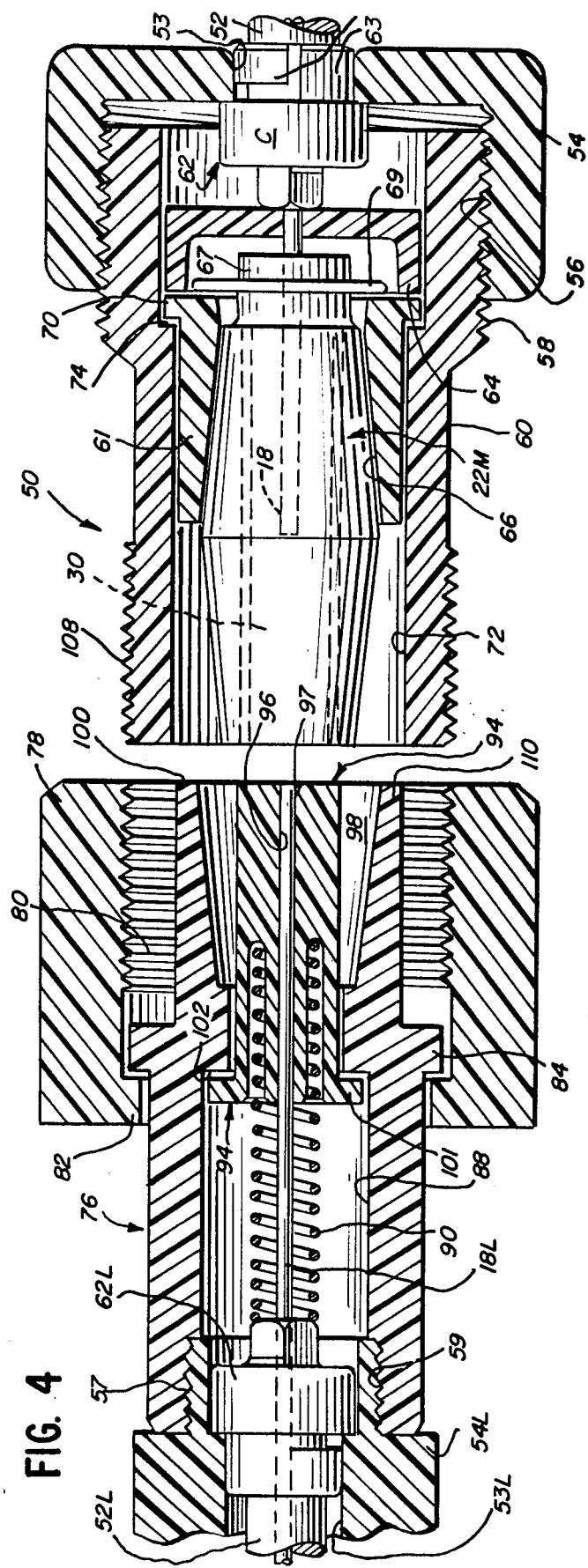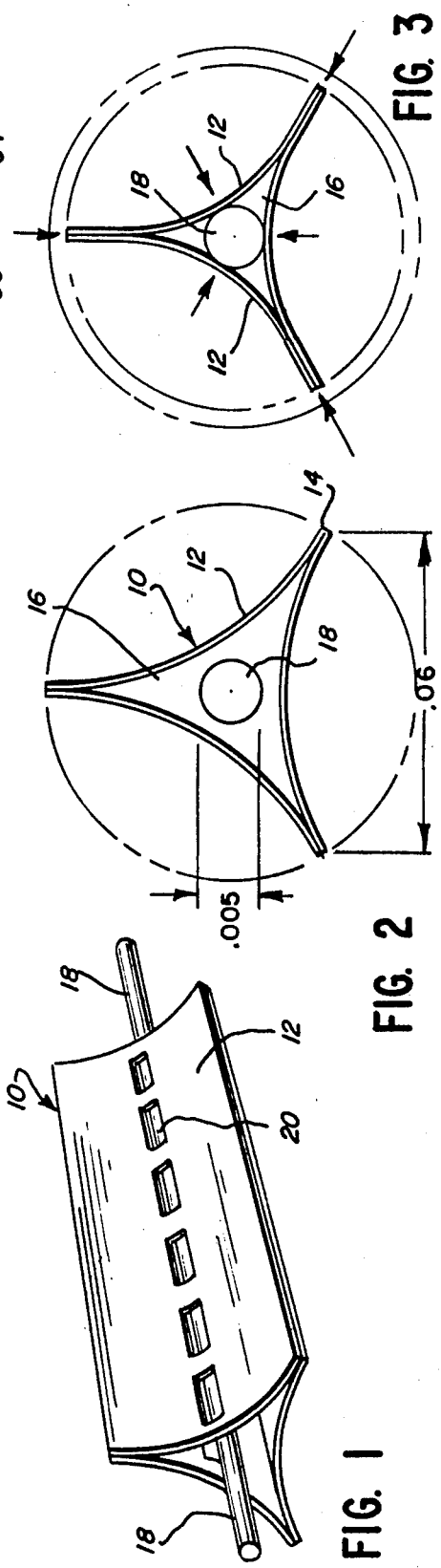

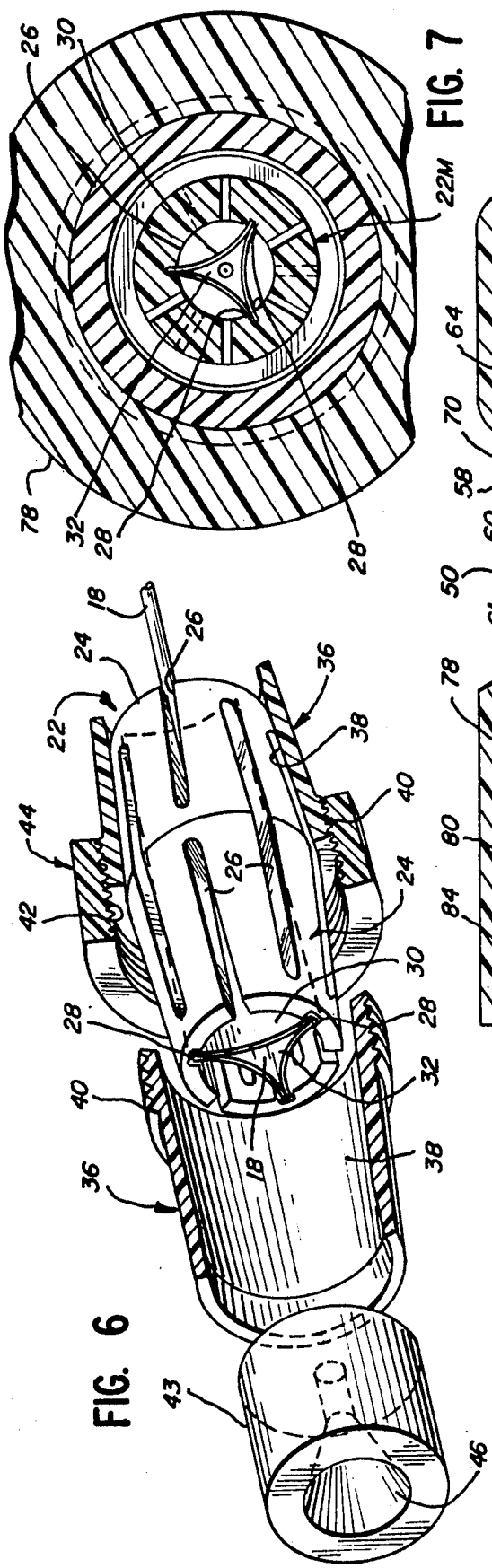
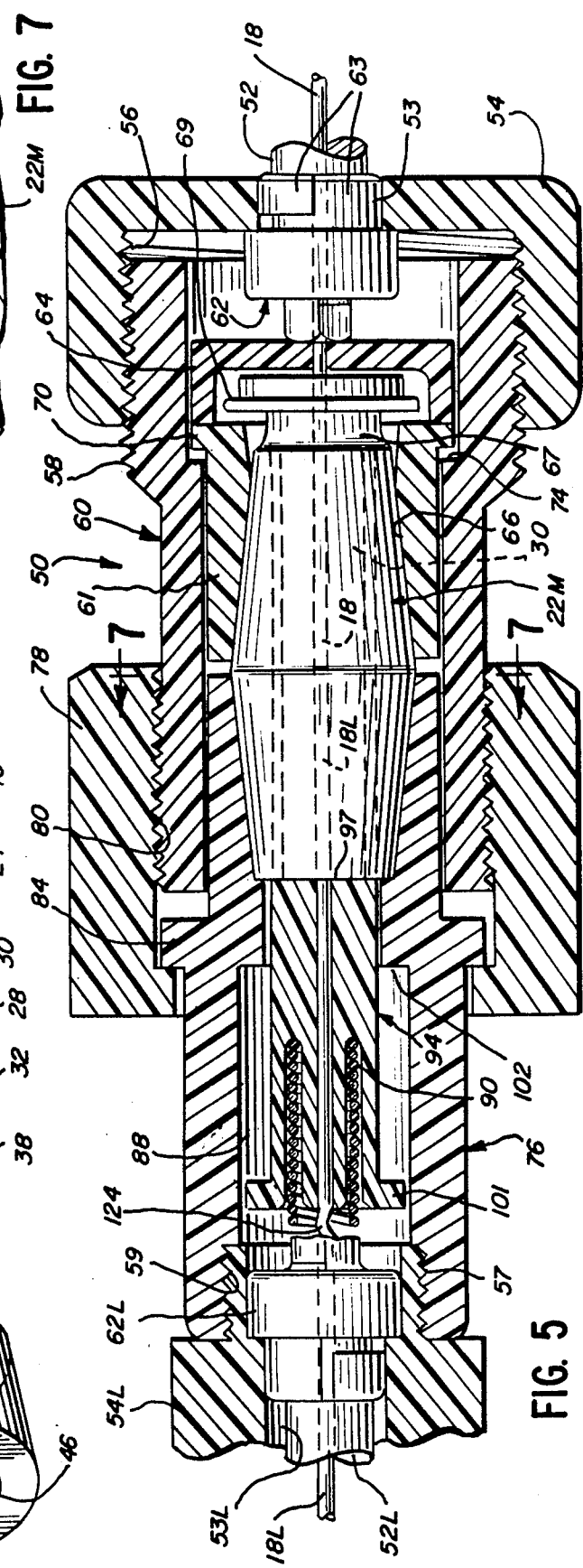

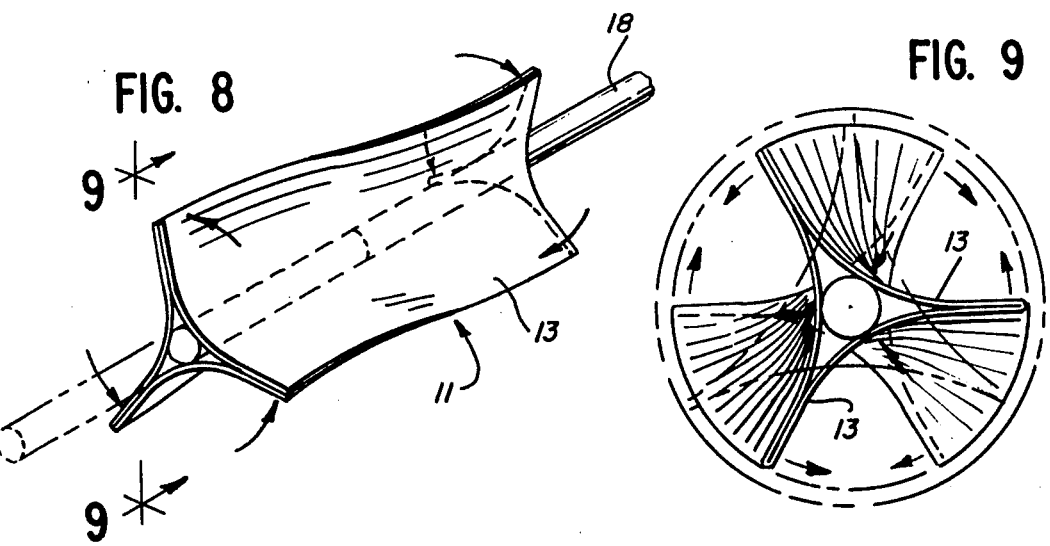
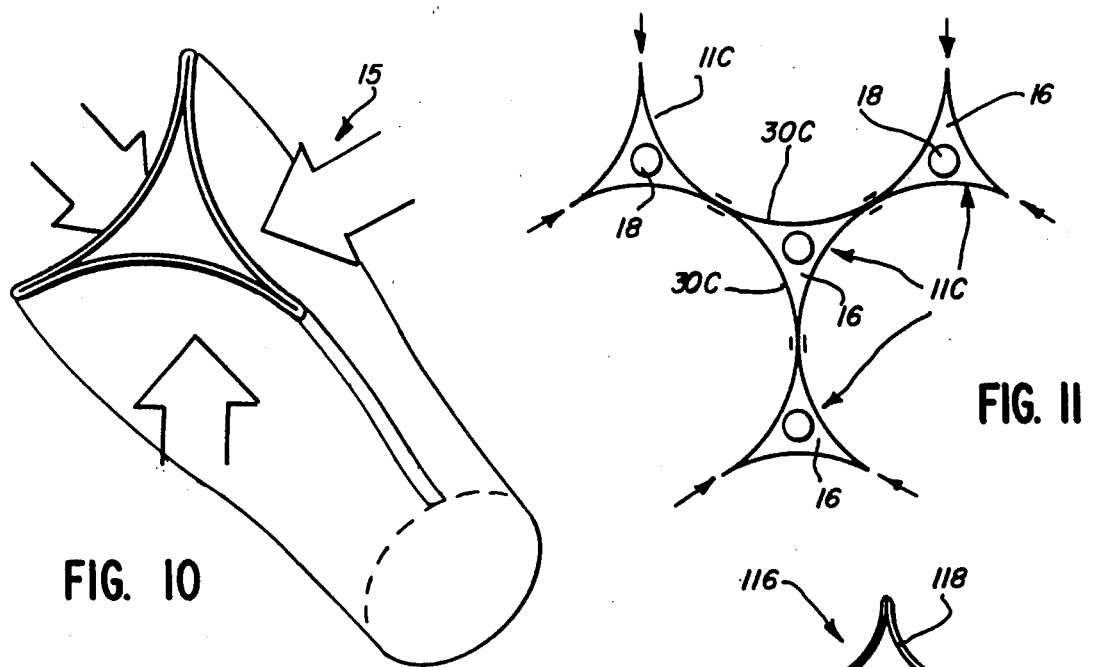
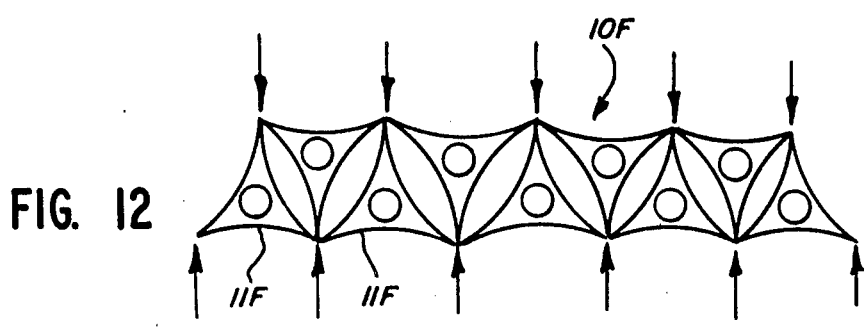

OPTICAL FIBER CONNECTOR CONSTRUCTION

This invention relates to a connector for use in aligning ends of optical fibers adapted to be joined in light signal transmissive connections. In particular, this invention is directed to the utilization of at least three, flexible, convex surfaces arranged in a rigid array defining in cross section a tricuspid channel or passageway. The longitudinal edges of the three walls are joined to form in transverse section three channel apices 120° apart. The channel-forming structure is of sufficient rigidity whereby application of a force at one apex directed toward the center of the channel may result in uniform and resilient movement of all three convex walls relative to the center of the fiber-receiving passageway defined thereby. By virtue of such movement, the tricuspid channel adapted to receive optical fibers to be joined may collapse upon abutting ends of optical fibers received therein so as to align such fibers along a common longitudinal axis.

The use of optical fibers for data transmission purposes has increased dramatically in recent years. Fiber optic systems often require connections between the ends of optical fibers so that a light signal conveyed by one may be transmitted to an adjacent fiber with which it is connected at an abutting interface. Unless the ends of optical fibers adapted to transmit a light signal are in a desired aligned condition, significant light losses may result. Losses may result from conditions such as: lateral misalignment or lack of coaxial coincidence wherein the optical fiber longitudinal centerlines are not in alignment. The most critical alignment condition which must be satisfied for efficient light transmission is a coaxial relationship of the abutting fibers. Misalignment of the abutting fiber ends can result in losses of 0.5 dB or higher.

A second alignment condition which must be satisfied for efficient light transmission between the abutting ends of optical fibers comprises the coplanar relationship at the normally planar ends of the fibers for efficient light transmission. The fiber end surfaces defining the interface whereat light passes from one fiber to the other should not be angularly disposed to each other.

A third condition which must be satisfied for efficient light transmission between the ends of optical fibers adapted to engage in a light transmissive connection comprises the absence of separation between the fiber faces, the fiber end separation resulting in light dissipation and loss.

The prior art has in the past resorted to various aligning expedients such as aligning abutting fiber ends along one edge of a square tube which may be filled with an index-matching liquid. A variety of fiber-connecting systems are disclosed in the article "Demountable Connectors for Optical Fiber System" by M. P. Bedgood, J. Leach and M. Mathews, published in *Electrical Communication*, Volume 52, No. 2, 1976.

Other prior art endeavors to efficiently connect the ends of optical fibers in signal transmissive connections are disclosed in the following U.S. patents: Schicketanz U.S. Pat. No. 3,870,395, Kent et al. U.S. Pat. No. 3,944,328, Bridger et al. U.S. Pat. No. 3,871,744, Sato U.S. Pat. No. 3,936,143, Dalgleish et al. U.S. Pat. No. 3,885,859, Matthews U.S. Pat. No. 3,902,785, Kersten U.S. Pat. No. 3,936,142, Martin U.S. Pat. No. 3,948,582, Cook et al. U.S. Pat. No. 3,950,075, Tardy U.S. Pat. No. 3,989,567, McCartney U.S. Pat. No. 3,990,779, Dalgleish et al. U.S. Pat. No. 4,008,948, Kao et al. U.S. Pat. No. 4,047,796 and Arnold U.S. Pat. No. 4,047,797.

In all of the foregoing, rigid connector or guide members are employed for purposes of effecting a guiding action on abutting ends of optical fibers to be joined in a signal transmissive connection.

Hodge application Ser. Nos. 968,044 (U.S. Pat. No. 4,192,575) and 968,045, filed Dec. 8, 1978 and commonly owned with this application, and the disclosures of which are incorporated herein by reference, are directed to optic fiber guides employing cylindrical glass surfaces for purposes of effecting a desired fiber-guiding action.

In all of the foregoing guiding structures, the fiber-receiving channels in which the fibers are disposed, are fixed in cross section in the course of effecting a connection.

The paper entitled "Connecting the Thread of Light" by Kenneth J. Fenton and Ronald L. McCartney, published at the Ninth Annual Connectors Symposium on Oct. 20 and 21, 1976 at the Cherry Hill Hyatt House in Cherry Hill, N.J., is of interest inasmuch as it discloses a three-rod guide which is plastic or deformable and employed for aligning a fiber end within a fiber optic connection section.

In McCartney U.S. Pat. No. 4,088,390 an optical fiber connector is disclosed which utilizes termination pins employing projecting eyelets having uniformly crimped walls for centering a housed optical fiber. The eyelets, however, are merely single fiber-centering or locating elements disposed in mating hermaphroditic connector halves, and are not employed for simultaneously aligning two butting fiber ends by collapsing of resilient, flexible channel walls. Thus, the construction disclosed is similar in its application to that disclosed in the paper entitled "Thread of Light."

In the application of Richard Lathlaen filed May 14, 1980 under Ser. No. 149,888, and entitled "Variable Geometry Optical Fiber Connector," filed concurrently herewith and commonly owned with the subject application, a generic optical fiber connector is disclosed comprising resilient convex walls which are deformed inwardly for purposes of uniformly and gradually reducing the cross section of a fiber-receiving channel defined by such convex surfaces to position and align the optical fiber disposed in that channel. In embodiments illustrated in the Lathlaen application, the deforming forces are generated by creating isostatic pressure in a medium surrounding the bodies which define the passageway. Moreover, the flexible walls of Lathlaen also are resilient, whereby they deform at the areas of contact with the glass fiber to be aligned. In the more rigid connector of this application a tangential engagement is effected between a rigid convex surface and a peripheral portion of the engaged fiber and the surface collapsing forces are concentrated at the surface edges only.

The connector construction of this invention requires no application of isostatic pressure but merely the application of forces applied at longitudinal edges of the tricuspid passageway center. As a result of the rigidity of the connector structure provided, all walls thereof will collapse or uniformly move inwardly. The disclosure of the Lathlaen application is incorporated herein by reference.

Certain prior art endeavors to guide abutting optical fiber ends into engagement and align the same for efficient light signal transmissive connections employed precisely formed bores in which the entering fibers are admitted only with difficulty. In an alternative method of guiding fibers into abutting engagement, the prior art utilized optical fiber guides having enlarged cross sections in which the fiber ends intended to abut are urged into an aligning corner or track whereat they may efficiently about in a face-to-face engagement. Similarly to the Lathlaen invention above summarized, the invention of this application is directed to a connector which possesses the desideratum of having a fiber-receiving channel which is initially of adequate cross-sectional area so as to readily receive at opposed entrance ends the ends of optical fibers to be engaged in a light transmissive connection. In addition, the provided connector employs a channel having a fiber-receiving cross-section which is shrunk as a result of the ability of the channel-forming walls to uniformly inwardly move.

Thus, it is an object of this invention to provide an optical fiber connector which readily receives the ends of optical fibers to engage in a light transmissive connection and which possesses a cross-section which is reduced as a result of a novel inward-flexing of the convex walls defining such channel.

It is a further object of this invention to provide a novel connector construction which consists of a small number of simple components which are amenable to mass production.

Inasmuch as the connector of this invention may be initially formed with the sectional area of the fiber-receiving channel of an adequate size to readily receive the fiber ends to be connected, there is no necessity for precise tolerances in the walls defining the channel.

It is a further object of this invention to provide a novel connector construction having a novel shrinking, fiber-receiving channel composed of elements which are inexpensive and which are of such size as to occupy a minimum of space. Accordingly, the connector of this application has particular applicability in those instances in which the occupying of a minimum amount of available space by an optical fiber connector is an important desideratum.

The above and other objects of this invention will become more apparent from the following detailed description when read in the light of the accompanying drawing and appended claims.

In one embodiment of the provided invention, an extruded "tube" of triangular section having concave outer walls so as to define an inner channel defined by convex walls joined at three longitudinal edges is provided. The connector structure may be formed of a metal such as a copper beyllium alloy and is flexible but also sufficiently rigid. Thus, upon application of forces to the tube edges, which forces are directed towards the center of the channel defined by the convex walls, all three walls deflect inwardly reducing the cross-sectional area of the channel defined thereby when said walls are in a state of rest.

Accordingly, following insertion of optical fibers to be abutted in a light-transmissive connection into the opposed open ends of such a connector until the fiber ends abut, all that need be done to urge the fibers into a desired relationship whereby they are aligned along a common longitudinal axis is to apply a force to one or more edges. The applied force will then inwardly flex and collapse the connector walls until they engage peripheral portions of the optical fibers disposed therein. The rigidity of the provided connector assembly enables all three walls to uniformly move upon application of forces to connector edges which forces are directed towards the center of the channel defined thereby.

The provided connector is adapted to be employed with a receiving housing which collapses about the periphery of the connector walls so as to uniformly apply inward forces to each of the three edges of such walls. Such forces result in a uniform inward wall flexing or collapse thereof. The connector of the provided invention may also take the form of three, discrete, concave wall members disposed in supporting slots disposed 120° apart on a circular periphery. The supporting slotted structures are adapted to inwardly converge so as to uniformly flex the convex walls defining a fiber-receiving channel, inwardly, in the manner above described with respect to the integral tube construction.

The provided connector constructions of this application may also be incorporated in a connector construction adapted to effect repeated connect-disconnect operations between the ends of optical fibers as will hereinafter be made more apparent.

For a more complete understanding of this invention, reference will now be made to the drawing, wherein:

FIG. 1 is a perspective view of an optical fiber connector made in accordance with this invention, illustrating optical fiber ends adapted to engage in abutting relationship entering from opposed ends of the connector;

FIG. 2 is an end elevational view of the connector of FIG. 1 illustrated in an initial position of rest with optical fibers disposed in the passageway defined thereby;

FIG. 3 is a view similar to that of FIG. 2 illustrating the convex connector walls in a collapsed state after they have been inwardly flexed by an inward movement of the three edge apices defined by the three joined walls;

FIG. 4 is a longitudinal sectional view illustrating one embodiment of an optical fiber connector adapted to effect repeated connect-disconnect operations on optical fiber ends;

FIG. 5 is a sectional view similar to that of FIG. 4 illustrating the connector components of FIG. 4 in a state of assembly;

FIG. 6 is a partially exploded perspective view, partly in section, of a modified connector construction adapted to join the ends of optical fibers in a light signal transmissive connection;

FIG. 7 is a transverse sectional view taken on line 7—7 of FIG. 5;

FIG. 8 is a perspective view of an optical fiber connector made in accordance with this invention illustrating the uniform collapse of the convex walls thereof upon application of turning couples to opposed ends thereof;

FIG. 9 is an end elevational view illustrating the displacement of the three walls of the illustrated connector upon imparting the twisting couples in the manner illustrated in FIG. 8 and taken along line 9—9 of said FIG. 8;

FIG. 10 illustrates the manner whereby a connector made in accordance with the teachings of this invention may be readily formed from a cylindrical tube;

FIG. 11 is a rather schematic representation illustrating the manner whereby four interconnected connectors defining tricuspid channels and made in accordance with the teachings of this invention may be simultaneously collapsed upon application of forces directed toward the channel centers as illustrated;

FIG. 12 is a schematic representation of a plurality of interconnected connectors made in accordance with this invention and particularly adapted for interconnecting abutting ends of optical fibers in a flat tube form whereby the fiber-receiving channels defined by the connectors may be reduced in cross-sectional area by the application of forces applied normal to the opposed main surfaces; and FIG. 13 is a sectional view similar to that of FIG. 2 illustrating a fiber connector formed of four collapsible convex walls.

Referring now more particularly to FIG. 1, a connector 10 is disclosed comprising three exteriorly concave and interiorly convex walls 12. The three walls 12 may comprise a single sheet of thin-gauge metal such as a phosphorus-bronze alloy or copper, which has been folded twice longitudinally, the distal ends of the sheet being welded or otherwise adhered together along their length. As an alternative construction, the three walls 12 may comprise discrete members as illustrated, welded or otherwise joined along their longitudinal edges. A further alternative comprises the formation of an integral connector having a continuous external periphery formed from a seamless cylindrical tube by inwardly forming the three walls with the desired concavities in the manner illustrated in FIG. 10. A further manner of formation of a connector, such as illustrated connector 10 having no distal edges, is the extrusion of an integral seamless member having the desired cross-section as illustrated in the drawing.

It will be noted from FIG. 2 that there is a desired size relationship between the dimensions of the walls 12 and the optical fibers to be housed therein for abutting engagement. It will be seen from FIG. 2 that the interval between apices 14 of the connector 10 (which in section are the guide longitudinal edges) is preferably approximately twelve times the diameter of the fiber to be housed within the channel 16 defined by the convex walls 12. It is apparent that FIG. 2 is not drawn to scale.

FIG. 3 illustrates the ability of the rigid wall assembly of FIG. 2 to uniformly collapse about the periphery of optical fibers 18 disposed therein. Upon the application of forces to the three apices 14 of the connector 10 a uniform inward flexing of the walls 12 results in the manner illustrated in FIG. 3. If a force is applied to one apex only and the remaining apices are restrained from spreading apart, the reaction forces at the restrained apices will effect collapse of all of the walls although all of the walls will not collapse uniformly. It will be further noted from FIG. 3 that, in addition to the inward flexing of the convex walls, the cross-sectional area of the fiber-receiving channel 16 has been reduced from that of FIG. 2 to that of FIG. 3 in which the peripheries of the optical fibers 18 are tangentially engaged by the innermost portions of each of the convex walls 12.

It is thus seen that a connector made in accordance with this invention is able to assume an initial uncollapsed position illustrated in FIG. 2 whereby the opposed entrance ends may have a sufficiently large cross-sectional area defining the fiber-receiving channel 16 so that the opposed ends of the optical fibers 18 may be readily threaded therein until they abut in the center. Following the desired fiber engagement within the interior of the fiber-receiving channel 16, the walls are collapsed in the manner illustrated in FIG. 3. Inasmuch as the width of the connector walls 12 is a small dimension, punched out recesses 20 may be formed at spaced intervals along the length thereof in the manner illustrated in FIG. 1 so as to facilitate inward flexing of each of the walls. Although all walls of a connector are preferably uniformly apertured to assure uniform flexing or collapse, a lesser number may be apertured for particular situations as when employing walls of different thicknesses.

In addition to being collapsible by the application of the forces indicated by the arrows in FIG. 3, the connectors made in accordance with this invention may also be uniformly collapsed by the application of a twisting couple to opposed ends thereof in the manner depicted with connector 11 illustrated in FIG. 8. As a result of the application of the twisting forces to opposed longitudinal end portions of the connector 11, the wall 13 thereof are collapsed and twisted along their length in the manner illustrated in FIG. 9. Accordingly, either mode of force application resulting in collapse or shrinkage of the cross-sectional area of the fiber-receiving channel of the connectors made in accordance with this invention will work to advantage, that is, either the direct inwardly directed application of force illustrated in FIG. 3 or the application of twisting forces as illustrated in FIG. 8.

As an alternative to the use of an integral connector member in which the three convex walls are joined along their longitudinal edges, three discrete convex strips may be inserted in a slotted longitudinal housing such as housing 22 of FIG. 6. Housing 22 has opposed outwardly tapering half portions 24 having longitudinal slots 26 formed therein for allowing radial flexing of the housing. Disposed 120° apart on the inner periphery of the housing 22 are parallel longitudinal grooves 28, each of said grooves being adapted to receive a pair of longitudinal edges of two convex connector walls 30. Each of the walls 30 comprises a discrete strip of metal, plastic or the like which is flexible so as to perform the desired optical fiber-aligning function above described. It will be noted from FIG. 6 that the housing walls define an interior, tricuspid, fiber-receiving channel or passageway 32. The illustrated optical fibers 18 may then enter the opposed ends of the passageway 32 defined by the walls 30 until they are in abutting engagement.

After the fiber ends effect an abutting engagement, the housing walls defining the passageway 32 are uniformly collapsed inwardly by simultaneously applying collapsing forces. The forces are applied to the three connector apices formed by longitudinal edges of the convex walls 30 disposed in housing grooves 28 to which the collapsing forces are in turn imparted by the collapsible housing 22. Inasmuch as the collapsing forces are uniformly applied radially inwardly, each of the three walls 30 uniformly flexes inwardly until it tangentially engages the peripheral surface portion of the optical fibers 18 within the channel 32.

The means for effecting such uniform collapsing of the housing 22 includes opposed collapsing sleeves 36. Each sleeve has an inner frusto-conical recess 38 adapted to snugly receive and inwardly compress the outer periphery of each tapered housing portion 24 as the sleeve approaches the center of housing 22. Disposed on the larger-diameter end of each sleeve 36 are male threads 40 adapted to threadedly engage female threads 42 of coupling ring 44 surrounding the central outer peripheral portion of the housing 22. The coupling ring female threads 42 are formed so that such threads may simultaneously engage the male threads of the opposed collapsing sleeves 36. Thus, as the sleeves 36 are threaded home and engage the female threads of the coupling ring 44, they gradually exert uniform collapsing forces on housing 22. The forces are transmitted to the apices defined by the longitudinal edges of walls 30, the surfaces of which define fiber-receiving channel 32 in which the opposed ends of fibers 18 are disposed.

To facilitate threading of optical fiber ends through the outer sleeves 36 and to assist in guiding such opposed fibers 18 into the ends of channel 32 defined by the convex walls 30, a frusto-conical guide element 43 having an inwardly-converging, funnel-shaped recess 46 is inserted in the interior frusto-conical passageway 38 of each collapsing sleeve 36. Such guides not only serve to guide the fibers into end entrances of the tricuspid aligning channel 32 disposed within the collapsible, slotted housing 26, but, in addition, serve to prevent entrance of any dirt or other foreign matter which may affect the efficiency of light transmission between the optical fibers into the housing interior. If a permanent splice between the fiber ends is intended, an appropriate hardenable epoxy resin may be inserted in the recess opening of the conical guide elements 43 to effect a seal and in the channel interior between the fiber ends to assure a permanent connection.

Elements of a connector construction 50 for effecting disengageable light transmissive connections between the ends of optical fibers is illustrated in FIG. 4 in disassembled relationship. In FIG. 4, optical fiber cable 52 traverses opening 53 of strain relief nut 54 having female threads 56 which engage male threads 58 of connector housing 60. A clamp 62 has jaws 63 thereof disposed in opening 53 about the outer periphery of optical fiber cable 52 from which optical fiber 18 extends, traversing an opening in spacer element 64. The clamp may be of the type disclosed in McKee application Ser. No. 943,153, filed Sept. 18, 1978 and entitled IMPROVED CLAMP CONSTRUCTION and clamp both the cable 52 and fiber 18. As central portion C of clamp 62 is of such size as not to pass through opening 53 of nut 54, it functions as a strain relief in conjunction with such nut when an axial pull is imparted to the cable.

Housing 60 has mounted therein a collapsing element 61 having a flared bore 66 adapted to receive in substantially interfitting relationship the right-hand tapered portion of slotted housing 22M which may be of substantially the same construction as the slotted housing 22 of FIG. 6, with the exception of elongate cylindrical base portion 67 which is partially housed in spacer element 64. A "C" ring 69 clamped to base portion 67 prevents axial movement to the left in FIG. 4 by abutting collapsing element 61. Accordingly, the right end of slotted housing 22M is received in the collapsing element frusto-conical bore 66. Element 61 has an annular retention flange 70 preventing the element 61 from moving out the open end of cylindrical passageway 72 of the connector housing 60 by engaging inner annular stop shoulder 74.

Housing 60 is adapted to intermate with connector housing 76 of FIG. 4 having a retained coupling nut 78 with female threads 80 disposed about an inner peripheral distal end portion thereof. The coupling nut is retained to the connector body portion 76 by means of an annular shoulder 82 which engages annular stop ring 84 integrally formed with the connector body 76.

Optical cable 52L enters the connector housing 76 from the left as illustrated in FIG. 4 and traverses opening 53L of a strain relief nut 54L having male threads 57 which engage housing female threads 59. Extending from cable 53L is optical fiber 18L disposed in the connector housing 76. Housing 76 has a longitudinal passageway 88 in which is disposed a spring 90 surrounding fiber 18L. The spring 90 abuts at the left end against clamp 62L engaging optical fiber cable 52L, and at the opposed right end engages a retractable guide sleeve 94 having a central bore 96 through which optical fiber 18L may pass. Fiber portion 18L terminates substantially flush with the end 100 of the housing portion 76 as seen in FIG. 4.

Surrounding the sleeve 94 is a housing frustoconical passageway portion defining the outer end limit of the connector housing 76. The retractable sleeve 94 is stopped in its spring-urged outward movement by means of stop flange 101 defining one end of sleeve 94 upon engaging annular stop shoulder 102 which defines one end limit of cylindrical chamber portion 88 in which flange portion 101 of the retractable sleeve is movable. Accordingly, the spring 90 will move the retractable sleeve outwardly toward the distal end of the frusto-conical passageway 98 of the connector housing 76 until these stop surfaces engage.

For purposes of effecting a light signal transmissive connection between the terminal ends of the optical fiber 18 disposed in the housing 60 and the end of the optical fiber 18L disposed in the housing 76, coupling nut 78 is threadedly engaged with male threads 108 disposed on the distal end of the housing 60. Such threaded engagement urges distal portion 110 of housing 76 defining frustoconical recess 98 in which the retractable sleeve is reciprocally movable, into telescoping engagement with the end portion of the cylindrical bore 72 of the housing 60.

In the course of such telescopic engagement, the frusto-conically relieved body portion 110 of the housing 76 will simultaneously have the inner peripheral surface 98 thereof slidaby engaged with and collapse the left frustoconical surface portion of the collapsible slotted housing 22M as appearing in FIG. 4 which is disposed within the housing 60. The distal end of retractable sleeve 94 abuts against the distal end of housing 68 during threaded engagement of the connector housings and is thus forced to gradually retract into the position of FIG. 5. It will be noted from FIGS. 4 and 5 that the distal end of fiber passageway 96 through which fiber 18L passes is relieved at 97 to eliminate any sharp edges which might scrape or otherwise impair the outer cladding disposed about the periphery of fiber 18L. As the guide sleeve 94 retracts, the optical fiber 18L continues to pass into the interior of the optical fiber-receiving passageway 32 defined by the walls 30 disposed within the interior of the slotted housing 22M as seen in FIG. 7. Accordingly, two functions are carried out simultaneously. The slotted housing 22M is radially collapsed so as to shrink the cross section of the fiber-receiving passageway 32, thereby aligning the ends of the fibers 18 and 18L, as simultaneously the fiber 18L progresses into the passageway. At the termination of the connection between the coupling nut 78 and the threads 108 of the connector body portion 60, the optical fibers are in desired abutting relationship as well as in desired coaxial relationship for purposes of effecting a desired light transmissive connection. This condition is illustrated in FIG. 5 of the drawing.

FIG. 7 is a transverse sectional view illustrating the manner in which the curved, discrete guide panels or walls 30 are received within the horizontal parallel grooves 28 which are formed 120° apart on the inner periphery of the slotted, resiliently collapsible housing 22M. It will be noted from FIG. 7 that the grooves 28 are positioned between the housing slots 26 formed in the housing 22M. The latter slots enable the various segments of the collapsible housing to flex inwardly for purposes of uniformly urging the apices of the triangularly-shaped channel 32 defined by the longitudinal edges of the discrete curved walls 30, inwardly so as to effect a simultaneous inward flexing of the curved surface portions of each of the walls or walls 30.

The connector 50 of FIGS. 4 and 5 is adapted for use in the field by a workman who need not be technically skilled. The connector 50 is adapted for repeated fiber connect-disconnect operations in the course of effecting light transmissive connections between optical fiber ends. A desired index-matching gel or liquid may be disposed in the interior of the channel 32 defined by the walls 30 in the vicinity of the juncture between the two fiber ends so as to enhance any light transmission and minimize light loss.

It is desired that the terminal ends of the illustrated fibers 18 and 18L of FIG. 4 engage in abutting relationship with no interval therebetween. To assure optimum light transmission, avoid light loss and have the fiber ends engage in a face-to-face relationship in the manner of FIG. 5, it is preferred that the lengths of the fibers 18 and 18L disposed within the connector assembly of FIGS. 4 and 5 be slightly greater than the interval between the ends of the optical fiber cables 52 and 52L from which the optical fibers extend. As a result, on completion of the connector assembly into the position of FIG. 5, a slight bow or strain relief in the fiber may be present as at 124 in FIG. 5 between the terminal end of the retractable sleeve 94 and the clamp 62L.

It will be understood by those skilled in the art that whereas the connector of FIGS. 4 and 5 as well as that of FIG. 6 employ screw-type engagements between the engageable halves, equivalent constructions may employ a bayonet, snap-type fit between the joining halves in which the collapsible triangular channel-forming element is disposed, and the resulting construction will work to equal advantage with those previously described.

Basic connector housing constructions similar to that illustrated in FIGS. 5 and 6 described which include a bayonet-type connection as well as a screw-type connection are disclosed in copending Hodge et al. U.S. application Ser. No. 943,470, (now U.S. Pat. No. 4,225,214) entitled "Connector Construction" filed Sept. 18, 1978, and commonly owned with the subject application. The disclosure of said application is incorporated herein by reference.

In the connector constructions of this invention above described, it is not necessary that the two connector mating portions reciprocally move relative to each other along a common longitudinal axis. As above pointed out, if the basic triangular guide element such as guide 10 of FIG. 2 is twisted along its length in the manner illustrated in FIG. 8, the collapse of the tricuspid fiber-receiving passageway defined thereby will take place similarly to the collapse effected by the application of forces normal to the apex-longitudinal edges of such triangular passageway. Thus, if two connector half portions are rotatable relative to each other in the course of effecting a connection therebetween and a tricuspid passageway of the type described above in detail is disposed in said half portions, there is no necessity for imparting radially collapsing forces if there are twisting forces imparted to the tricuspid guide in the manner illustrated in FIG. 8.

Accordingly, it is apparent that the connector of this application by virtue of its rigidity of structure is able to collapse in a plurality of manners providing for flexibility in the normal course of installation and use. The collapsing force imparted to the tricuspid channel may be imparted to one apex and, assuming the other two apices may react to such force, the latter will result in collapse of the fiber-receiving interior passageway defined by the collapsed walls. The provided connector may be construed as a three-point spring element acting in a radial direction through each apex and resisting crush forces.

FIG. 10 is a perspective view illustrating the manner whereby a tricuspid channel made in accordance with this invention may be formed from an integral cylindrical tubing by the application of collapsing forces disposed 120° apart so as to form the desired triangular sectional configuration, as illustrated in the upper portion of the collapsed tube 15. Following formation of the triangular cross-section the concave walls should be resiliently flexible to provide the fiber-aligning functions above described.

FIG. 11 is illustrative of contiguous generally triangular optical fiber guide elements 11C which may be integrally formed from unitary sheet members 30C whereupon the application of collapsing forces in the direction of the arrows normal to the apices defined by the sheets 30C will result in simultaneous uniform collapse of the fiber-receiving channels 16. It is thus apparent that the structure of the fiber guide illustrated in FIGS. 1 through 3 may be multiplied upon itself into the configuration of FIG. 11 or one similar thereto.

FIG. 12 illustrates a further modified guide 10F wherein the individual interconnected triangular guide elements 11F are simultaneously collapsed by the application of opposed forces indicated by the arrows. Thus, the collapsible guide 10F of FIG. 12 would find application for use in conjunction with a plurality of optical fibers in the form of a flat cable or the like in which parallel discrete fibers are to be simultaneously connected in substantially the same horizontal plane. In an alternate method of force application one series of apices in FIG. 12 is stationary and forces are applied to the opposed, substantially linearly aligned series of tapered wall edges.

FIG. 13 is illustrative of a modified collapsible guide 116 and depicts the ability of this invention to be incorporated in a collapsing guide structure composed of more than three wall portions. Obviously, inwardly convex walls 118 illustrated in FIG. 13 may be discrete and maintained in a slotted collapsible housing, welded together, or formed from an integral tube or an integral sheet joined along terminal longitudinal edges. Guide 116 is illustrative of the ability of the invention of this application to be incorporated in any sectional configuration in which the number of collapsing walls may be a number greater than three.

It is believed apparent from the foregoing discussion that a novel connector construction has been provided which allows for ready reception in opposed connector ends of optical fiber ends to be joined in a light signal transmissive connection. The connectors of this invention also provide for uniform or substantally uniform shrinkage of the fiber-receiving passageway so that the fiber ends disposed within such passageway may be aligned along a longitudinal axis. The connector channel collapsing force is readily applied to one or more tapered edges of converging walls defining such channel.

The basic connector construction comprising collapsing walls disclosed in this application may be incorporated in a variety of fiber connector constructions. The material of fabrication of the guide of this invention may be plastic or a metal such as a phosphorus-bronze alloy or copper. Such materials of fabrication are presented by way of example only as it is apparent to those skilled in the art that any material of fabrication will work to advantage if it possesses the property of being able to uniformly or substantially uniformly flex and collapse in the manner above described. As slight apex movements in the provided connectors result in correspondingly greater movement of the curved wall portions of the connector, stop means may be provided to prevent the application of crushing forces on the fibers by the innermost portions of the wall surfaces which could result in fiber damage and light loss. Also, thin, apertured Mylar or other plastic coverings may be disposed over opposed ends of the connector fiber-receiving channels to prevent dirt contamination of the fiber juncture.

In view of the many modifications which have been made apparent of the basic invention described in this application, it is intended that this invention be limited only by the scope of the appended claims.

What is claimed is:

1. A connector for optical fibers adapted to be joined in an optical signal transmissive connection comprising at least three flexible convex surfaces defining an open-ended passageway in which optical fibers are to engage in optical signal transmissive relation intermediate the passageway open ends; the ends of said surfaces converging into terminal exterior edges; discrete means engaging said edges for exerting forces on said edges directed toward said passageway to thereby flex said surfaces and reduce the size of said passageway defined thereby, said flexible surfaces being substantially uniform and defining a rigid flexing system in which inward flexing which increases the concavity of one of said surfaces results in substantially the uniform flexing of the remainder of said convex surfaces.

2. The connector of claim 1 in combination with two optical fibers to be joined in a light signal transmissive connection; means for locating one fiber end in said passageway intermediate the open ends thereof; means for advancing a second fiber end into an open end of said passageway spaced from said one fiber end for light signal connection with said first fiber end and actuating the force exerting means whereby said flexible convex surfaces are urged into tangential engagement with said first and second fibers.

3. The connector of claim 2 in which optical cables from which said first and second optical fibers extend are engaged by strain relief means whereby forces imparted to such cables are prevented from being imparted to such optical fibers.

4. The connector of claim 1 in which a tapered guide for guiding an optical fiber into said open ended passageway is disposed adjacent each of the opposed passageway open ends; each said guides having an optical fiber guide passageway tapering to and terminating at an open end of said passageway.

5. The connector of claim 4 in which a sealing means is inserted in each of said tapered guide passageways whereby said optical fiber connection within said open ended passageway may be sealed from the ambient atmosphere.

6. The connector of claim 1 in combination with a collapsible housing having parallel recesses disposed about the inner periphery thereof, and said convex surfaces having the terminal edges thereof disposed in said recesses; each recess receiving two edges of adjacent convex surfaces; and means for substantially uniformly collapsing the periphery of said housing whereby said passageway defined by said flexible surfaces may simultaneously uniformly collapse.

7. In a method of aligning optical fibers in desired optical signal transmissive relation in a fiber-receiving channel having a system of convex, flexible, channel-defining walls joined along longitudinal edges, said system being rigid whereby collapsing of one of said convex walls results in substantially uniform collapse of the remainder of said walls; the step comprising shrinking said fiber-receiving channel cross-sectional area by application of a collapsing force to longitudinal edges only of said flexible channel-defining walls until said optical fiber ends are disposed along a common horizontal axis.

8. In a method of aligning optical fibers in desired optical signal transmissive relation in a fiber receiving channel having flexible channel-defining walls forming an array of resiliently flexible, convex walls defining a channel of uniform cross-section; such convex walls joining along cusp-defining longitudinal channel edges, the steps comprising disposing optical fiber ends in said channel with at least a portion of each fiber end in abutting engagement; and shrinking said receiving channel cross-sectional area by concentrating a wall-collapsing force on said longitudinal wall edges until said fiber ends are aligned along a common axis.

9. The method of claims 7 or 8 in which the receiving channel shrinking step includes the step of the innermost arcuate portion of each convex wall defining said channel tangentially engaging a peripheral portion of each fiber in the course of said shrinking step.

10. The method of claims 7 or 8 in combination with the step of preventing excessive inward flexing of the walls whereby damage to optical fibers disposed in said channel is avoided.

11. The method of claims 7 or 8 in which the collapsing force is applied at substantially right angles to said edges along axes traversing said channel.

12. The method of claims 7 or 8 in which the collapsing force is generated by twisting said channel defining walls along the length thereof.

13. A connector for use in effecting light signal transmissive connections between the ends of optical fibers, comprising a plurality of flexible convex surfaces defining a passageway of substantially uniform cross-section for receiving ends of optical fibers to be connected; said convex surfaces defining a periphery having spaced, exteriorly disposed edges defined by converging longitudinal edges of adjacent convex surfaces; said convex surfaces defining a wall array of sufficient rigidity whereby the application of a force to one of said exteriorly disposed edges directed toward the passageway center results in substantially uniform movement of said convex surfaces relative to the center of said passageway.

14. The connector of claim 13 in combination with means for applying force to the converging edges only of at least two contiguous convex surfaces for bending such surfaces and shrinking said passageway defined by said convex surfaces.

15. A connector for use in effecting optical signal transmissive connections between the ends of optical fibers, comprising a plurality of convex surfaces defining a passageway for receiving ends of optical fibers to be connected; said convex surfaces defining a periphery having spaced tapered edges defined by converging surfaces; said convex surfaces defining a wall array of sufficient rigidity whereby the application of a force to one of said tapered edges directed toward the passageway center results in movement of all of said convex surfaces relative to the center of said passageway.

16. The connector of claim 15 in combination with means for applying force concentrated on the edge only of two adjacent converging surfaces and directed toward said passageway center for inwardly flexing said adjacent surfaces defining said edge and shrinking the cross-section of said passageway.

17. The connector of claims 13 or 15 in which said flexible surfaces comprise convex walls defining an integral unit joined at longitudinal edges.

18. The connector of claims 13 or 15 in which said flexible surfaces comprise convex walls formed from a single strip of flexible material which is bent along two longitudinal edges and has distal strip edges joined along a third longitudinal edge.

19. The connector of claims 13 or 15 in combination with two optical fiber ends disposed in said passageway in an optical signal transmissive connection; the shortest interval between the edges of each convex surface being approximately twelve times the diameter of said optical fibers.

20. A connector for use in effecting optical signal transmissive connections between the ends of optical fibers comprising at least three discrete flexible surfaces defining an open-ended passageway for receiving ends of optical fibers to be connected therein; said flexible surfaces defining exterior tapered edges and interior cusps where connected, and means for flexing said surfaces so as to shrink the cross-section of said passageway by concentrating forces on all of said edges simultaneously; said forces being directed toward said passageway so as to shrink the fiber-receiving cross-section of said passageway; the flexing means effecting substantially uniform inward movement of said flexible surfaces relative to the center of said passageway.

21. The connector of claims 13, 15 or 20 in which said flexible surfaces are sufficiently resilient so as to return to substantially their original configurations following release of an applied force for shrinking said passageway.

22. The connector of claims 13, 15 or 20 in which said flexible surfaces define a tricuspid passageway having three, substantially uniform convex walls; said walls being arranged relative to each other whereby a force applied to wall edges joining at one cusp results in substantially uniform movement of all three convex walls.

23. The connector of claims 13, 15 or 20 in which said flexible surfaces comprise discrete convex sheets which have edge portions thereof retained in parallel groove-defining portions of said connector; said groove-defining portions of said connector being simultaneously and uniformly movable relative to the central axis of said passageway.

24. The connector of claims 13, 15 or 20 in which at least one of said surfaces has a plurality of aligned openings to facilitate bending thereof when the cross-section of the passageway defined thereby is shrunk.

25. The connector of claims 13, 15 or 20 in combination with two optical ends disposed in said passageway in an optical signal transmissive relation; said fibers being of such diameter as to be readily received in opposed passageway ends with said passageway in a normal unshrunken condition.

* * * * *

UNITED STATES PATENT AND TRADEMARK OFFICE
CERTIFICATE OF CORRECTION

PATENT NO. : 4,353,620  
DATED : October 12, 1982  
INVENTOR(S) : Ronald L. Schultz Page 1 of 5

It is certified that error appears in the above-identified patent and that said Letters Patent is hereby corrected as shown below:

Column 11, line 33, after "flexible" insert -- wall sections having -- line 34, after "passageway" insert -- therebetween -- line 36, change "surfaces" to -- sections -- line 40, delete "surfaces" and insert -- wall sections -- line 41, delete "flexible surfaces" and insert -- wall sections -- line 44, delete "the"

line 64, after "each" insert -- of --

Column 12, lines 6 and 7, delete "convex surfaces" and insert -- wall sections -- line 9, delete "convex surfaces" and insert -- wall sections -- line 11, after "flexible" insert -- convex -- line 13, delete "fibers" and insert -- fiber ends -- line 16, after "along" insert -- exteriorly exposed -- line 17, after "whereby" insert -- application of --

UNITED STATES PATENT AND TRADEMARK OFFICE
CERTIFICATE OF CORRECTION

PATENT NO. : 4,353,620

DATED : October 12, 1982

INVENTOR(S) : Ronald L. Schultz

It is certified that error appears in the above-identified patent and that said Letters Patent is hereby corrected as shown below:

Column 12, line 17, after "collapsing" delete "of" and insert -- force to -- line 18, delete "convex walls" and insert -- edges -- line 19, delete "the remainder of"

line 21, after "to" insert -- said exteriorly exposed - line 30, after "along" insert -- exteriorly disposed -- line 35, after "said" (first occurrence) insert -- exteriorly disposed -- line 54, after "flexible" insert -- wall sections having -- line 55, after "passageway" insert -- therebetween -- line 57, delete "convex surfaces" and insert -- wall sections -- line 59, delete "edges" and insert -- edge portions -- line 59, delete "convex surfaces" and insert -- wall sections -- lines 59 and 60, delete "convex surfaces" and insert -- wall sections -- line 62, after "edges" insert -- and -- line 68, delete "convex surfaces" and insert -- wall sections --

UNITED STATES PATENT AND TRADEMARK OFFICE
CERTIFICATE OF CORRECTION

PATENT NO. : 4,353,620

DATED : October 12, 1982

INVENTOR(S) : Ronald L. Schultz

Page 3 of 5

It is certified that error appears in the above-identified patent and that said Letters Patent is hereby corrected as shown below:

Column 13, line 1, delete "surfaces" and insert -- wall sections -- line 5, after "comprising" insert -- flexible wall sections having -- line 6, after "passageway" insert -- therebetween -- line 7, delete "convex surfaces" and insert -- wall sections -- line 9, delete "surfaces" and insert -- edge portions of said wall sections -- line 9, delete "convex surfaces" and insert -- wall sections -- line 15, change "edge" to -- edges -- line 16, delete "surfaces" and insert -- wall sections -- line 18, delete "surfaces" and insert -- wall sections -- line 18, change "edge" to -- edges -- line 21, delete "flexible surfaces" and insert -- wall sections --

UNITED STATES PATENT AND TRADEMARK OFFICE
CERTIFICATE OF CORRECTION

PATENT NO. : 4,353,620
DATED : October 12, 1982
INVENTOR(S) : Ronald L. Schultz

It is certified that error appears in the above-identified patent and that said Letters Patent is hereby corrected as shown below:

Column 13, line 24, delete "flexible surfaces" and insert -- wall sections -- line 24, delete "walls" and insert -- wall sections -- line 36, after "flexible" insert -- wall sections having -- line 37, after "passageway" insert -- therebetween -- line 38, delete "flexible"

Column 14, line 1, delete "surfaces" and insert -- wall sections -- lines 2 and 3, delete "surfaces" and insert -- wall sections -- lines 8 and 9, delete "flexible surfaces" and insert -- wall sections --

UNITED STATES PATENT AND TRADEMARK OFFICE
CERTIFICATE OF CORRECTION

PATENT NO. : 4,353,620             Page 5 of 5

DATED : October 12, 1982

INVENTOR(S) : Ronald L. Schultz

It is certified that error appears in the above-identified patent and that said Letters Patent is hereby corrected as shown below:

```
Column 14, line 11, delete "surfaces" and substitute -- wall
                    sections --
           line 16, delete "flexible surfaces" and insert
                    -- wall sections --
           line 17, delete "walls" (both occurrences) and
                    insert -- wall sections --
         line 19,   after "wall" insert -- section --
           line 20, delete "walls" and substitute -- wall
                    sections --
           line 22, delete "surfaces" and insert -- wall sections
           line 29, delete "surfaces" and insert -- wall sections
           line 33, after "optical" insert -- fiber --
           line 37, Delete "unshrunken" and insert -- unshrunk --
```

Signed and Sealed this

Fifth Day of April 1983

[SEAL]

Attest:

GERALD J. MOSSINGHOFF

Attesting Officer     Commissioner of Patents and Trademarks